United States Patent [19]
Phillippi et al.

[11] 3,926,034
[45] Dec. 16, 1975

[54] DEVICE FOR MEASURING LASER BEAM PENETRATION TIME

[76] Inventors: Conrad M. Phillippi, 7420 Brantford Road, Dayton, Ohio 45414; Donald F. Stevison, 218 Zimmerman St., New Carlisle, Ohio 45344; Willard J. Ekman, 4543 Kendall Drive, Woodbridge, Va. 22193

[22] Filed: Feb. 27, 1975

[21] Appl. No.: 553,699

[52] U.S. Cl. .................................................. 73/15 R
[51] Int. Cl.² ........................................... G01N 25/00
[58] Field of Search ...... 73/15 R, 15 A, 159, 190 R, 73/355

[56] References Cited
UNITED STATES PATENTS

| | | | |
|---|---|---|---|
| 2,196,481 | 4/1940 | Stephenson | 73/15 |
| 3,148,531 | 9/1964 | Stoll et al. | 73/15 |
| 3,665,750 | 5/1972 | Dawn et al. | 73/15 |

*Primary Examiner*—Herbert Goldstein
*Attorney, Agent, or Firm*—Joseph E. Rusz; James S. Shannon

[57] ABSTRACT

Apparatus for measuring the resistance of a material to laser radiation in terms of the time interval required for a laser beam of given power density and size to burn through a specimen of the material of given thickness. Small conductive switch strips easily severed by the laser beam are placed across the path of the laser beam on either side of the test specimen and are included in the start and stop circuits of an electronic interval timer. The timer measures the interval between the successive severences of the strips by the laser beam, which equals the time required for the beam to penetrate the test specimen.

4 Claims, 2 Drawing Figures

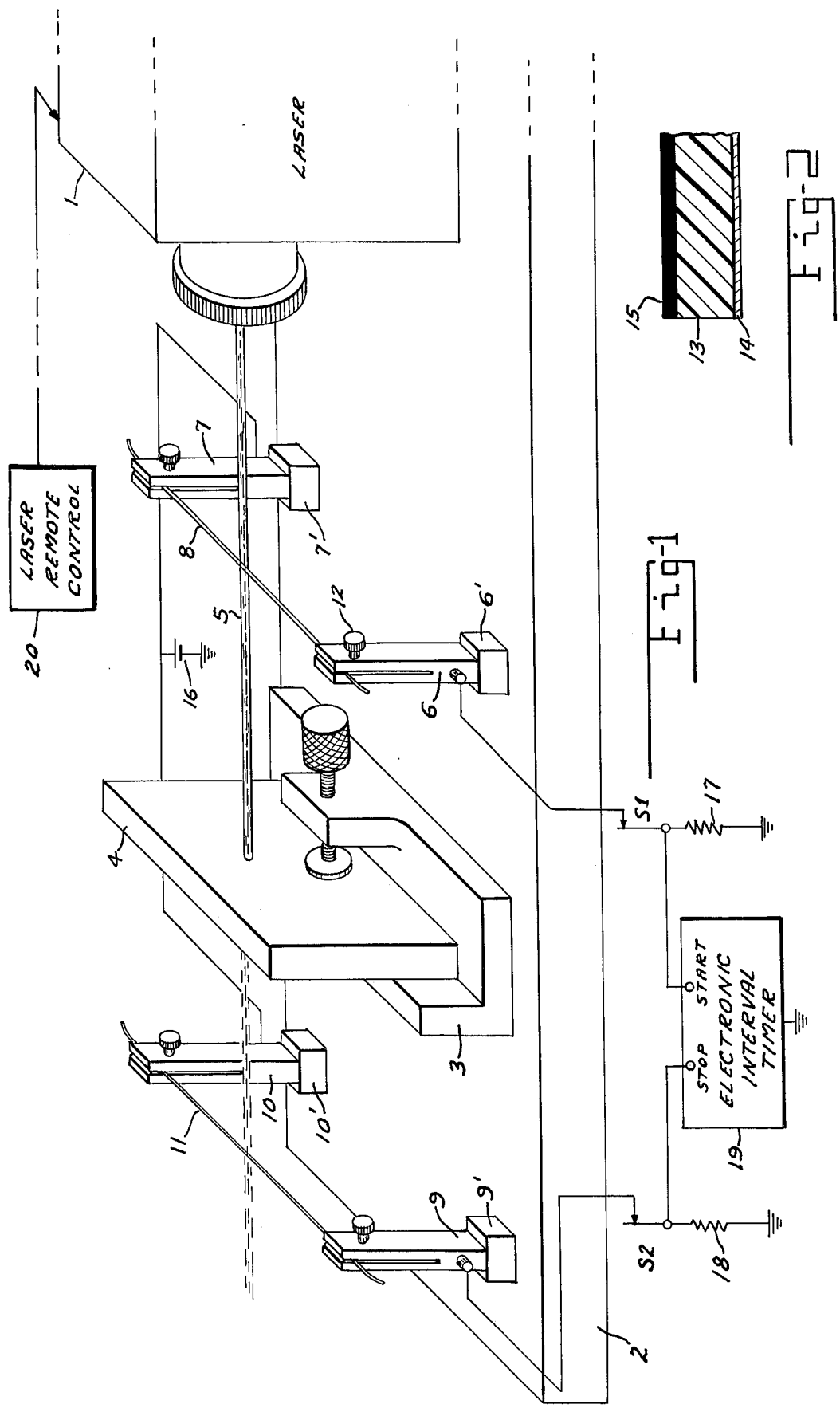

DEVICE FOR MEASURING LASER BEAM PENETRATION TIME

RIGHTS OF THE GOVERNMENT

The invention described herein may be manufactured and used by or for the Government of the United States for all governmental purposes without the payment of any royalty.

This invention relates to the testing of materials, particularly the testing of materials for resistance to laser radiation.

In accordance with the invention, the resistance of a material to laser radiation is obtained in terms of the time interval required for a laser beam of given power density and size to burn through a given thickness of the material. It is the purpose of the invention to provide simple and reliable apparatus for measuring this interval.

Briefly, the test apparatus comprises a laser capable of producing a beam of continuous radiation of suitable power density that can be turned on and off at will. Means are provided for supporting a specimen of the material to be tested in the path of the beam. Two small conductive switch strips are supported on either side of the specimen in such positions as to intersect the laser beam path. The switch strip located between the specimen and the laser forms part of the energized start circuit for an electronic interval timer. Similarly, the switch strip located on the opposite side of the specimen forms part of the energized stop circuit of the timer. The start and stop functions are triggered by deenergization of the respective circuits. The switch strips are small enough and of such material as to be almost instantaneously severed when subjected to the laser beam. With this arrangement, the switch strip in the start circuit of the timer is severed at substantially the same instant that the laser beam impinges upon the specimen, and the switch strip in the stop circuit of the timer is severed at substantially the instant at which the laser beam succeeds in burning through the specimen, which results in the timer measuring the interval required for the beam to burn through the specimen.

The invention will be described in more detail with reference to the accompanying drawing in which:

FIG. 1 shows a test apparatus in accordance with the invention, and

FIG. 2 is a cross section of a suitable switch strip as used in the test apparatus.

Referring to the drawing, laser 1 is mounted on a base 2 along with a suitable clamping device 3 for holding a specimen 4 of the material to be tested in the path of the laser beam 5. Also mounted on the base 2 are holders 6 and 7 for a start switch strip 8, and holders 9 and 10 for a stop switch strip 11. The holders are all alike, being made of metal in the form of a clamp tightened by a thumbscrew as shown at 12 for holder 6. The holders serve the dual purpose of physically supporting and making electrical connection to the switch strips. The metal holders may rest on insulating bases 6', 7', 9', and 10' if the base 2 is not an insulator. The switch strips are clamped in the holders at the proper level to intersect and be centered on the axis of the laser beam 5.

The cross section of a suitable switch strip is shown in FIG. 2. The switch strip may be constructed of a 1/16 inch wide ribbon of 0.0005 inch polyvinylchloride film 13 for support, a very thin layer 14 of evaporated aluminum, estimated to be 1000A thick, for electrical conductivity, and an overcoating 15 of black paint for high absorption of the laser radiation. The strips should be installed with the black coating facing the laser. As an alternative arrangement, the switch strip may be manufactured without the black coating and a small area facing the laser may be spray coated with black paint after the strip has been installed in the holders. In the latter case, it is immaterial whether the aluminum coated or the uncoated side faces the laser since the spray coating is limited to the central portion of the strip and therefore cannot interfere with electrical connections to the strip.

When switch strips 8 and 11 are intact, direct current source 16 provides a steady current flow through holder 7, strip 8, holder 6, normally closed test switch S1, and resistor 17 to ground; and similarly, a current through holder 10, strip 11, holder 9, normally closed test switch S2, and resistor 18 to ground. The voltages developed across resistors 17 and 18 are applied to the start and stop terminals, respectively, of electronic interval timer 19.

The timer 19 may be of any suitable type, its design forming no part of the invention. A number of interval timers for this purpose are available commercially, an example being the Hewlett-Packard Electronic Counter Model 523CR. In these timers the start and stop functions as a matter of choice may be triggered either by the application of a voltage to the start and stop terminals or by the sudden removal of a voltage from these terminals. The latter mode of operation is used in this case. Thus, prior to the test when switch strips 8 and 11 are intact, the voltages across resistors 17 and 18 exist at the start and stop terminals, respectively, of the timer 19.

With the specimen and switch strips in place as previously described, a test is performed by energizing the laser, as by the laser remote control switch 20. The laser beam first severs the switch strip 8 causing a sudden removal of voltage from the start circuit of timer 19 which initiates operation of the timer. After the beam has burned through the specimen 4 it severs switch strip 11, removing the voltage from the timer stop circuit and terminating operation of the timer. The timer therefore measures the interval between the breaking of strip 8 and the breaking of strip 11. Although a slight amount of time is required for the laser beam to sever a switch strip, typically about 10 milliseconds, the measured interval between breaking the strips equals the time required for the beam to burn through the specimen since the resulting 10 millisecond delay in starting the timer is offset by a corresponding 10 millisecond delay in stopping the timer. The slight error introduced by the absorption of energy from the laser beam by strip 8 during the 10 milliseconds required for it to burn through is entirely negligible and may be minimized by making the size of the switch strip as small as possible relative to the beam size.

Since the relationships between burn through time and specimen thickness and between burn through time and beam power density are not linear, and since burn through time for a given beam power density is affected by beam size, comparisons between different materials should be made with specimens of the same thickness and laser beams of the same power density and size.

We claim:

1. Apparatus for measuring the time required for a laser beam to penetrate a test specimen of a material as a measure of the resistance of the material to laser radiation, said apparatus comprising: a laser, having on-off control means, for producing, when on, a beam of radiation of predetermined size and power density; means for supporting a test specimen of the material in the path of said beam; first and second small conductive switch strips each capable of being easily severed by said beam; means for holding said first strip tautly across the path of said beam between the specimen and the laser; means for holding said second strip tautly across the path of said beam on the opposite side of the specimen from said laser; an electronic interval timer having start and stop circuits; means including the holding means for said first strip for including the first strip as a control element in the start circuit of said timer; and means including the holding means for said second strip for including the second strip as a control element in the stop circuit of said timer.

2. Apparatus as claimed in claim 1 in which each of said switch strips is constructed of a thin plastic ribbon of smaller size than the laser beam with an evaporated thin metallic coating on one side to provide electrical conductivity.

3. Apparatus as claimed in claim 2 in which said switch strip also has on one side a black coating for high absorption of laser radiation.

4. Apparatus as claimed in claim 1 in which the plastic of which said ribbon is made of polyvinylchloride and in which the metal of said thin metallic coating is aluminum.

* * * * *